Dec. 19, 1967          I. L. WILCOX ETAL          3,358,975
                   BLANK HEATING MECHANISM
Filed May 19, 1965                           4 Sheets-Sheet 1

INVENTORS.
ISAAC L. WILCOX.
RONALD M. WELLS.
BY
D. Emmett Thompson
ATTORNEY.

Dec. 19, 1967   I. L. WILCOX ETAL   3,358,975
BLANK HEATING MECHANISM
Filed May 19, 1965   4 Sheets-Sheet 2

INVENTORS.
ISAAC L. WILCOX.
RONALD M. WELLS.
BY D. Emmett Thompson
ATTORNEY.

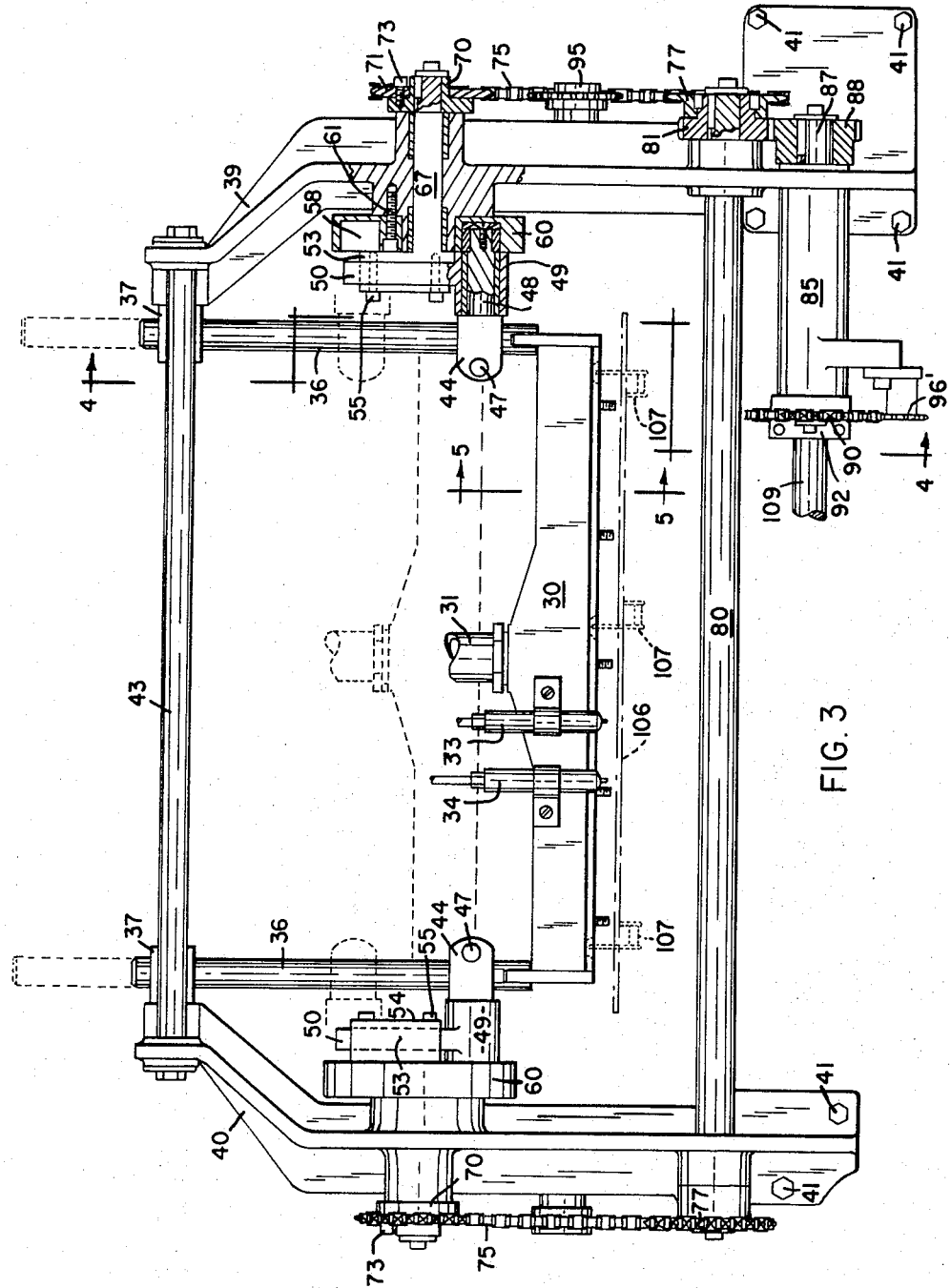

Dec. 19, 1967  I. L. WILCOX ETAL  3,358,975
BLANK HEATING MECHANISM
Filed May 19, 1965  4 Sheets-Sheet 4

INVENTORS.
ISAAC L. WILCOX.
RONALD M. WELLS.
BY
D. Emmett Thompson
ATTORNEY.

United States Patent Office 3,358,975
Patented Dec. 19, 1967

3,358,975
BLANK HEATING MECHANISM
Isaac L. Wilcox and Ronald M. Wells, Fulton, N.Y., assignors to Phillips Petroleum Company, a corporation of Delaware
Filed May 19, 1965, Ser. No. 457,082
2 Claims. (Cl. 263—6)

ABSTRACT OF THE DISCLOSURE

A procession of flat paperboard blanks is advanced by a continuously running conveyor. A burner is moved downwardly into heat exchanging relation to a selected area only of each blank and is maintained in such relation to the blank during the advancement thereof for a predetermined distance.

---

This invention has to do with apparatus for heating a selected area of a flat blank to render the material thereof, or the coating thereon, plastic, preparatory to adhering the heated portion or area of the blank to another part of the blank or to another blank. In the formation of certain articles, such as containers, it is common practice to employ blanks formed of paperboard for the component parts of the container, which blanks are coated with a thermoplastic material. The overlapping or contacting areas of the blanks are heated to render the coating plastic. The heated areas are then pressed together, and the components are thus adhered one to the other in the erection of the container.

The invention has as an object a mechanism operable to heat a selected area of a flat blank while the blank is being advanced toward a station where the selected heated area of the blank is placed into engagement with another area of the blank or an area of a second blank.

The invention is shown and described herein in connection with a carton forming machine of the type disclosed in Patent 2,726,583.

The invention consists in the novel features and in the combinations and constructions hereinafter set forth and claimed.

In describing this invention, reference is made to the accompanying drawings in which like characters designate corresponding parts in all the views.

In the drawings—

FIGURE 3 is an enlarged view of the heating mechanism as shown in the central portion of FIGURE 2.

Figure 1:
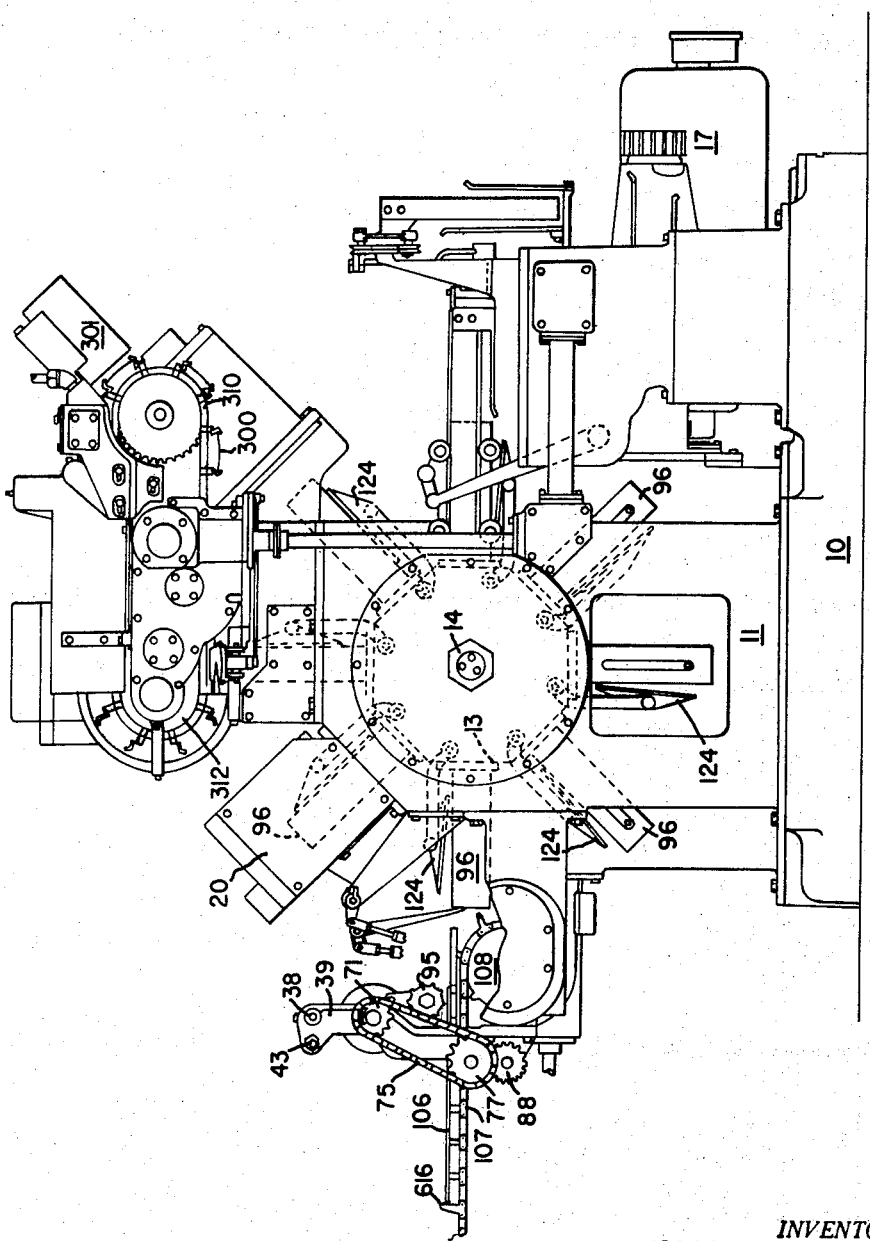
FIGURE 1 is a side elevational view of a container or carton forming machine. In the left portion of this view, the apparatus of the invention is shown in end elevation.
Figure 2:
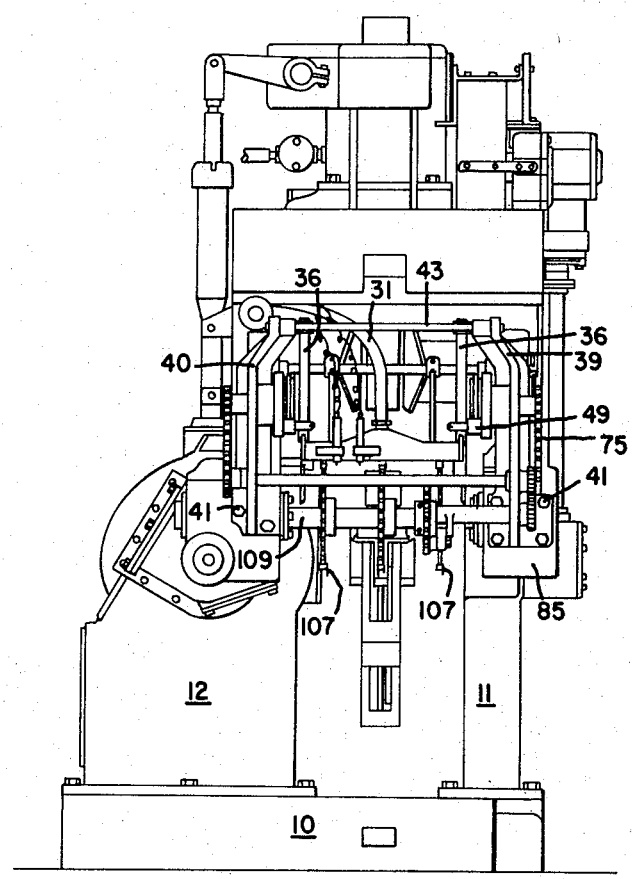
FIGURE 2 is a view looking to the right, FIGURE 1.

Referring to FIGURE 1, the container making machine illustrated consists of a framework having a base 10 and upright side members 11, 12. A turret 13 is journalled between the side members 11, 12 for rotation about a horizontal axis indicated at 14. The turret is provided with a plurality of radially extending mandrels 96, rectangular in cross section. Body blanks 106 are moved to the right, FIGURE 1, by a conveyor chain 107. The chain 107 is provided with blank supporting lugs 615 and positioning lugs 616, see FIGURE 4. Certain areas of the blanks 106 are heated while being advanced by the conveyor chains 107. These chains are trained over sprockets 108 mounted on a shaft 109, see FIGURES 2 and 4. The shaft 109 is journalled in the framework of the machine and is rotated in timed relation to the indexing of the turret 13, the machine being operated by a motor 17, FIGURE 1. The blanks 106 are advanced by the conveyor chains 107 to the right, FIGURE 1, to the left, FIGURE 4, over a mandrel 96, then in horizontal position, and the blanks are advanced so that the trailing edge of the blank is positioned flush with the outer end of the mandrel 96. The blank is clamped against the mandrel by a clamp 124. The turret is indexed and the flat blank is wrapped about the mandrel 96, and the side wall seam is formed by a mechanism contained within a housing 20, see FIGURE 1.

The turret 13 is again indexed to position the mandrel carrying the wrapped blank to vertical position, at which time a bottom end closure is heat sealed to the outer end of the wrapped blank on the mandrel 96. These end closures are formed from flat blanks 300, advanced intermittently by a chain 310 trained over sprockets 311, 312, the blanks having been extracted from a magazine 301 and deposited in carriers on the chain 310. With the wrapped blank in vertical position, a heated bottom blank 300 is moved over the end of the wrapped container and is heat sealed thereto.

The entire structural arrangement and functioning of the machine is set forth in Patent 2,726,583 previously mentioned.

This invention has to do particularly with apparatus for heating a selected area of each of the blanks 106, specifically the area along the trailing edge of the blank. It will be apparent from the above description that the trailing edge of the blank is positioned at the outer end of the mandrel 96, and it is to that area of the wrapped blank to which the enclosure 300 is adhesively secured. The entire area of the upper surface of each of the blanks 106 is heated during advancement by the conveyor chains 107 to effect sterilization of the inner surface of the formed container, and the side edges of the blanks are heated to render the thermoplastic coating tacky to effect the side wall seam of the container, when the blank 106 is wrapped around the mandrel. This heating is explained in the Patent 2,726,583. In that machine, the jaws for sealing the marginal portion of the bottom blanks 300 to the wrapped side walls were heated. Heating the trailing edge of the blanks 106 by this invention permits substantial reduction of temperature of the bottom blank sealing jaws, or completely does away with the necessity of heating the sealing jaws.

This heating of the trailing or rear edge of the body blanks 106 results in a number of advantages. The previous arrangement in requiring the bottom sealing jaws to be run at high temperature greatly reduces the life expectancy of the bottom sealing head mechanism and, further, the hot jaws prevented applying bottom closure blanks 300 coated on their exterior surfaces with certain thermoplastic materials; for example, polyethylene. With blanks coated with such material, the material built up on the hot jaws to such an extent that it was not practical to use such thermoplastic material. With this invention, sufficient heat is transferred in the area along the trailing edge of the body blank so that the temperature thereof is sufficiently high to permit the application of bottom closure blanks 300 without the necessity of using heated jaws in the bottom applying mechanism.

The heater in the arrangement of this invention is located to effect heating of the trailing edge portion of the blanks 106 just prior to their movement onto the waiting mandrel 96.

Preferably, the heater is in the form of an elongated gas burner 30 extending transversely above the conveyor chains 107. The heater is provided with a supply of gas through a flexible conduit 31, FIGURES 2 and 3. The heater is provided with ignition means 33, and failsafe means 34, of conventional arrangement. An electrically-operated heater may be used in place of the gas heater.

Figure 5:
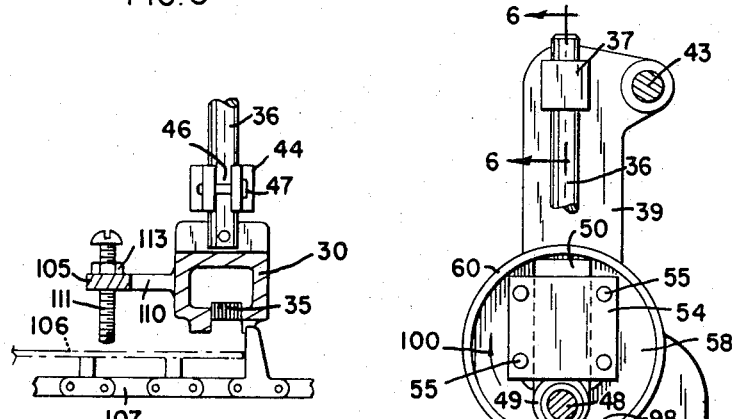
FIGURE 5 is a view taken on line 5—5, FIGURE 3.

The heater 30 is in general of tubular formation having a bottom wall formed with a multiplicity of small apertures 35, FIGURE 5, to permit impingement of the flame on the blank.

The ends of the heater 30 are attached to supporting means, including vertically disposed rods 36, the upper ends of which are slidably mounted in blocks 37, having trunnions 38 journalled in the main supporting brackets 39, 40. The brackets 39, 40 are affixed to the uprights 11, 12 as by cap screws 41. The upper ends of the brackets 39, 40 are connected together by a tie rod 43.

To each of the heater supporting rods 36 there is adjustably attached, adjacent the lower end thereof, a block 44. These blocks are apertured to receive the supporting rods 36, and each block is slotted as at 46 and provided with a clamping screw 47, whereby the blocks 44 are adjustably clamped to the rods 36. Each of the blocks 44 is formed with a trunnion 48, see FIGURE 3, journalled in a carrier 49. Each carrier is formed with a stem portion 50 rectangular in cross section, and slidably mounted in a slot formed in a crosshead 53 provided with a plate 54 secured to the crosshead, as by screws 55, and serving to retain the stem portion 50 in the slot in the crosshead. Trunnions 48 of the members 44 extend through the carriers 49 and are provided on their inner ends with rollers 57 positioned in a slot 58 formed in the face of a cam member 60 fixedly secured to the brackets 39, 40 as by screws 61 extending through apertures 62, formed in the cam 60, and threaded into the brackets, see FIGURE 3. Each of the crossheads 53 is fixedly secured to, or formed integral with, a trunnion 67 journalled for rotation in the bracket members 39, 40. A collar 70 is keyed to the outer end of each of the trunnions 67, and there is a sprocket 71 mounted on each collar. Each of the sprockets 71 is formed with an arcuate slot to receive a screw 73 extending through the slot and threading into the collar 70. A drive chain 75 is trained over each of the sprockets 71 and over a driving sprocket 77. The sprockets 77 are fixedly secured to the ends of a shaft 80 journalled in the lower portion of the brackets 39, 40. This shaft 80 extends transversely below the conveyor chains 107. One of the sprockets 77, shown at the right, FIGURE 3, is keyed to a gear 81 which, in turn, is keyed to the shaft 80. The sprockets 77 at the left end of the shaft 80, FIGURE 3, is keyed to the shaft.

There is a housing 85 carried by the bracket 39 and in which is journalled a shaft 87. A spur gear 88 is keyed to one end of the shaft 87 and is arranged in mesh with the spur gear 81.

A sprocket 90 is fixed to the opposite end of the shaft 87, and a chain 91 is trained over this sprocket and over a split sprocket 92 secured to the main conveyor chain shaft 109. With this arrangement, it will be apparent that the crosshead members 53 are rotated in timed relation to the advancement of the conveyor chains 107. An idler sprocket 95 is provided for maintaining proper tension on the chain 75, and an idler sprocket 96' is provided for maintaining proper tension on the chain 91.

Figure 7:
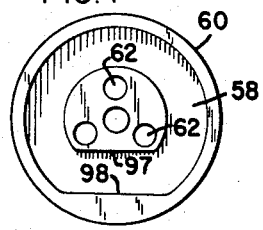
FIGURE 7 is an inner face view of one of the heater guide cams.
Figure 6:
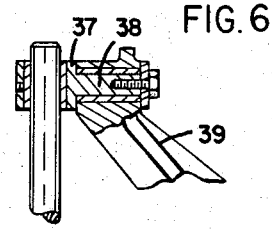
FIGURE 6 is a sectional view taken on line 6—6, FIGURE 4.
Figure 8:
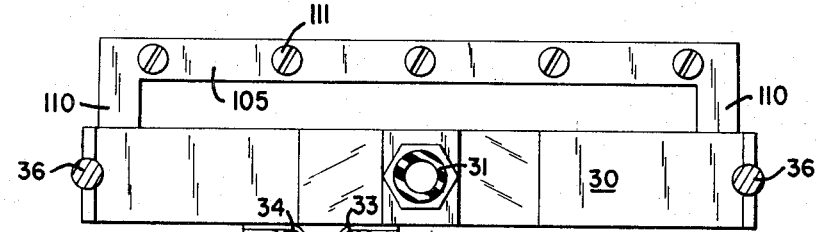
FIGURE 8 is a top plan view of the heater.
Figure 4:
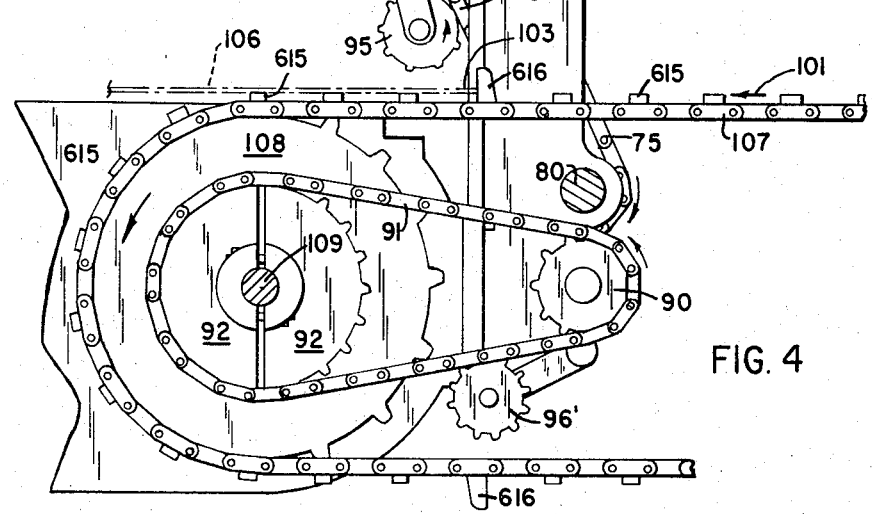
FIGURE 4 is a view taken on line 4—4, FIGURE 3.

Referring to FIGURE 7, it will be seen the major portion of the cam slot 58 is of circular form and concentric about the axis of the trunnion 67. The lower portion of the cam slot 58 extends horizontally in a direction parallel to the movement of the conveyor chains 107. The inner side of this straight portion is defined by the surface 97 and the outer side of this straight portion of the cam slot is defined by the wall 98, FIGURE 7. Accordingly, as the crossheads are rotated in unison, the rollers 57 move in the cam slots 58. Referring to FIGURE 4, the crossheads rotate in a clockwise direction, as indicated by the arrow 100, and the conveyor chains move to the left, as indicated by the arrow 101. In FIGURES 3 and 4, the rollers 57 are positioned in the lower horizontal portion of the cam slot 58. The timing is such that as the rear or trailing edge 103 of the blank 106 approaches a position below the cam 60, the rollers 57 have approached the horizontal portion of the cam slot, and the heater 30 has moved downwardly into heat exchanging relation to the marginal area along the trailing edge 103 of the blank. The rollers 57 then move forwardly along the straight portion of the cam slot maintaining the heater in such heat exchanging relation with the trailing edge of the blank, while it is being advanced a predetermined distance. Thereupon, the rollers 57 move upwardly in the curved portion of the cam slot 58, rapidly moving the heater upwardly out of heat exchanging relation with the blank. When the crossheads 53 have revolved to move the rollers 57 along the curved portion of the cam tracks 58 and again approach the straight portion of the cam slot, the next succeeding blank in the procession has arrived with its trailing edge immediately below the heater.

With this arrangement, the marginal area along the trailing edge of each blank is heated during its advancement by the conveyor chains 107.

On occasion, when the blanks 106 are formed of paperboard, the blanks are warped or curled, or depending upon the moisture content and arrangement in the blank, the blanks either warp or curl during application of heat from the heater 30. To prevent areas of such warped or curled blanks being positioned too close to the heater 30, the heater is provided with a bar 105 fixed at its ends by leg portions 110. The bar 105 extends in spaced parallel relation to the heater 30 and is formed with a plurality of tapped holes to receive screws 111. The screws are threaded into the bar 105 and serve as stop members for engagement with restricted areas of the blank 106 to maintain a minimum spacing between the blanks and the heater 30. The screws are maintained in adjusted position by jam nuts 113.

With this heater arrangement, sufficient heat is imparted to the trailing edge portion of each blank so when the blanks have been wrapped about the mandrel and appear at the bottom applying station in the machine, this area is at a sufficiently high temperature, whereby an effective seal can be obtained between the bottom blank and the side wall blank without the necessity of using heated jaws in the bottom applying mechanism.

What we claim is:

1. Apparatus for heating a restricted selected area extending across a flat blank having a thermoplastic surface, a continuously running conveyor for advancing a procession of said blanks, an elongated heater extending transversely of the conveyor above the same out of heat exchanging relation with said blanks, means operable to move said heater downwardly into heat exchanging relation to said area only of each blank in said procession during the advancement thereof for a predetermined distance and thereupon moving said heater upwardly.

2. Apparatus for heating blanks as defined in claim 1, and including a plurality of stop members carried by said heater and positioned in close proximity to the flat blank for engagement thereby to limit warping of the heated blank during application of heat thereto.

References Cited

UNITED STATES PATENTS

| 1,768,662 | 7/1930 | Buckley | 158—99 X |
| 1,949,901 | 3/1934 | Cosh | 158—99 X |
| 2,388,762 | 11/1945 | Powers | 263—8 |
| 2,494,994 | 1/1950 | Gamallo | 266—23 |
| 2,605,091 | 7/1952 | Socke | 263—6 X |
| 2,984,942 | 5/1961 | Wynne et al. | 263—2 X |

FREDERICK L. MATTESON, Jr., *Primary Examiner.*

JOHN J. CAMBY, *Examiner.*